United States Patent
St. Pierre

(10) Patent No.: US 10,462,166 B2
(45) Date of Patent: Oct. 29, 2019

(54) SYSTEM AND METHOD FOR MANAGING TIERED BLACKLISTS FOR MITIGATING NETWORK ATTACKS

(71) Applicant: Arbor Networks, Inc., Burlington, MA (US)

(72) Inventor: Brian St. Pierre, Acworth, NH (US)

(73) Assignee: Arbor Networks, Inc., Westford, MA (US)

( * ) Notice: Subject to any disclaimer, the term of this patent is extended or adjusted under 35 U.S.C. 154(b) by 460 days.

(21) Appl. No.: 15/290,809

(22) Filed: Oct. 11, 2016

(65) Prior Publication Data
US 2018/0103057 A1    Apr. 12, 2018

(51) Int. Cl.
*H04L 29/06*    (2006.01)

(52) U.S. Cl.
CPC .......... *H04L 63/1425* (2013.01); *H04L 63/20* (2013.01)

(58) Field of Classification Search
None
See application file for complete search history.

(56) References Cited

U.S. PATENT DOCUMENTS

| | | | | |
|---|---|---|---|---|
| 7,849,502 B1 * | 12/2010 | Bloch | ............... | H04L 29/12066 726/11 |
| 8,161,155 B2 * | 4/2012 | Van Der Merwe | ......................... | G06F 16/9535 709/225 |
| 8,510,834 B2 * | 8/2013 | Chesla | .................. | H04L 63/145 713/168 |
| 8,539,576 B2 * | 9/2013 | Van der Merwe | ...... | G06F 21/55 726/11 |
| 8,621,065 B1 * | 12/2013 | Saurel | ................. | H04L 63/1466 709/200 |
| 9,009,250 B2 * | 4/2015 | Luna | ...................... | H04W 28/02 709/213 |
| 9,100,428 B1 * | 8/2015 | Visbal | ................. | H04L 63/1441 |
| 9,223,972 B1 * | 12/2015 | Vincent | ................. | G06F 21/566 |
| 9,430,646 B1 * | 8/2016 | Mushtaq | ............... | G06F 21/554 |
| 2008/0086772 A1 * | 4/2008 | Chesla | .................. | H04L 63/145 726/23 |
| 2008/0147861 A1 * | 6/2008 | Oishi | ..................... | G06F 21/565 709/225 |
| 2009/0245176 A1 * | 10/2009 | Balasubramanian | ......................... | H04W 48/20 370/328 |
| 2010/0251329 A1 * | 9/2010 | Wei | ...................... | H04L 63/1408 726/1 |
| 2012/0124666 A1 * | 5/2012 | Kim | .................... | H04L 63/1458 726/23 |

(Continued)

*Primary Examiner* — Farid Homayounmehr
*Assistant Examiner* — Olanrewaju J. Bucknor
(74) *Attorney, Agent, or Firm* — Locke Lord LLP; Scott D. Wofsy; Christopher J. Capelli

(57) ABSTRACT

A method, system, and computer-implemented method to manage blacklists used for mitigating network traffic is provided. The method includes monitoring a first blacklist and a second blacklist, wherein the first blacklist is used by a first mitigation process applied to network traffic that is performed upstream along a communication path of the network traffic relative to a second mitigation process that is performed using the second blacklist. The method further includes moving at least one entry from one of the first and second blacklists to the other of the first and second blacklist based on a result of the monitoring.

10 Claims, 4 Drawing Sheets

(56) References Cited

U.S. PATENT DOCUMENTS

| | | | |
|---|---|---|---|
| 2012/0167210 A1* | 6/2012 | Oro Garcia | H04L 63/1425 726/22 |
| 2014/0157405 A1* | 6/2014 | Joll | H04L 63/1425 726/22 |
| 2014/0380457 A1* | 12/2014 | Cassell | H04L 63/0236 726/13 |
| 2017/0054761 A1* | 2/2017 | Schryver | H04L 63/205 |
| 2018/0013774 A1* | 1/2018 | Sander | H04L 63/101 |

* cited by examiner

SYSTEM AND METHOD FOR MANAGING TIERED BLACKLISTS FOR MITIGATING NETWORK ATTACKS

FIELD OF THE INVENTION

The disclosed embodiments generally relate to computer network protection, and more particularly, to a system and method for managing tiered blacklists for mitigating network attacks.

BACKGROUND OF THE INVENTION

Networks are constantly exposed to security exploits that are of significant concern to network providers. For example, Denial of Service ("DoS") attacks can cause significant damage to networks and networked devices. A DoS attack is defined as an action taken upon on a computer network or system by an offensive external device that prevents any part of the network from functioning in accordance with its intended purpose. This attack may cause a loss of service to the users of the network and its network devices. For example, the loss of network services may be achieved by flooding the system to prevent the normal servicing for performing legitimate requests. The flooding may consume all of the available bandwidth of the targeted network or it may exhaust the computational resources of the targeted system.

A Distributed Denial of Service ("DDoS") attack is a more aggressive action that involves multiple offensive devices performing an attack on a single target computer network or system. This attack may be performed in a coordinated manner by these multiple external devices to attack a specific resource of a service provider network. The targeted resource can be any networking device such as routers, Internet servers, electronic mail servers, Domain Name System ("DNS") servers, etc. Examples of a DDoS attack include (but are not limited to): large quantities of raw traffic designed to overwhelm a resource or infrastructure; application specific traffic designed to overwhelm a particular service; traffic formatted to disrupt a computer device from normal processing; traffic reflected and/or amplified through legitimate computer devices; traffic originating from compromised sources or from spoofed IP addresses; and pulsed attacks (which start/stop attacks).

Other network security threats include Trojan horse attacks that may be embedded in harmless software, viruses that can reproduce themselves and attach to executable files, worms that can spread via stored collections of e-mail addresses, and logic bombs that can remain dormant until triggered by an event (e.g., a date, user action, random trigger, etc.).

Threat management systems (TMSs) usually use deep packet inspection to mitigate network attacks (e.g., DDOS attacks), however such close inspection of every packet consumes a large amount of resources of the TMS, such as central processor unit (CPU) and memory resources. A method of reducing consumption of TMS resources includes using a blacklist that includes a list of entries. Each entry includes a characteristic of network traffic that has been identified as being associated with an attack, such as the address of a source of the network traffic. The network traffic can be compared to the blacklist entries for blocking network traffic that has a characteristic that matches any of the entries.

Different types of blacklists can be used, such as software or hardware implementations at different locations relative to the TMS, such as using software internal to the TMS, at the edge of the TMS (e.g., an in-chassis switch), or a device physically remote from the TMS. Each implementation using a blacklist has associated advantages and disadvantages. These disadvantages can interfere with efficient mitigation of network attacks.

Such conventional methods and systems have generally been considered satisfactory for their intended purpose. However, there is still a need in the art for efficient use of different types of blacklists that take into account the advantages and disadvantages of each type of blacklist. The present disclosure provides a solution for these problems.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a method for managing blacklists used for mitigating network attacks. In aspects of the disclosure, a computer system and computer-readable medium are provided that implement a method. The method includes monitoring a first blacklist and a second blacklist, wherein the first blacklist is used by a first mitigation process applied to network traffic that is performed upstream along a communication path of the network traffic relative to a second mitigation process that is performed using the second blacklist. The method further includes moving at least one entry from one of the first and second blacklists to the other of the first and second blacklist based on a result of the monitoring.

BRIEF DESCRIPTION OF THE DRAWINGS

The accompanying app dices and/or drawings illustrate various non-limiting, example, inventive aspects in accordance with the present disclosure.

DETAILED DESCRIPTION OF CERTAIN EMBODIMENTS

Figure 1:
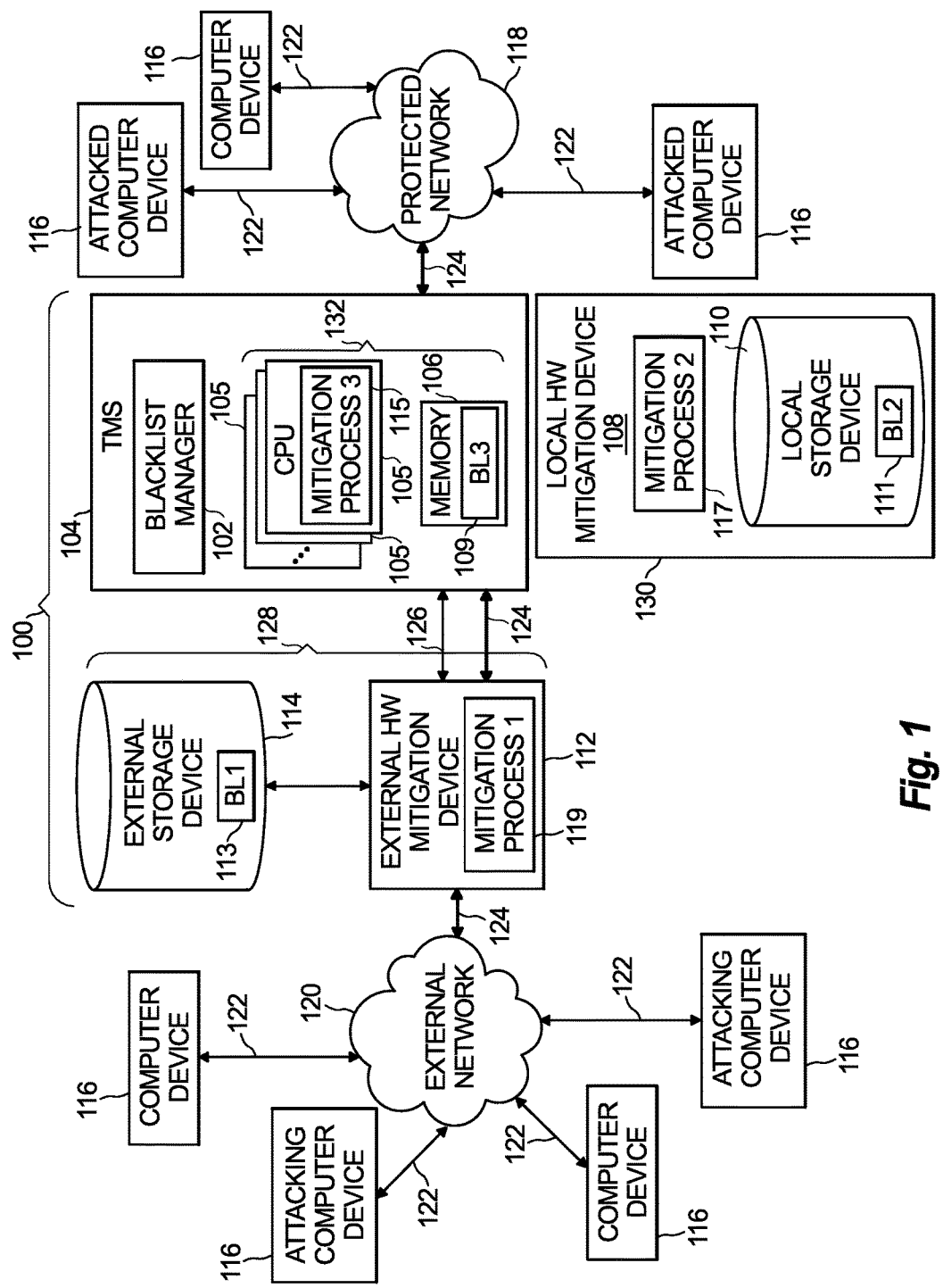
FIG. 1 illustrates a block diagram of an example network protection system having a threat management system that uses a blacklist monitor in accordance with an aspect of the disclosure.

Reference will now be made to the drawings wherein like reference numerals identify similar structural features or aspects of the subject disclosure. For purposes of explanation and illustration, and not limitation, a block diagram of an exemplary embodiment of a network protection system in accordance with the disclosure is shown in FIG. 1 and is designated generally by reference character 100. Other embodiments of the network protection system 100 in accordance with the disclosure, or aspects thereof, are provided in FIGS. 2 and 3, as will be described.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. It is to be appreciated the embodiments of this disclosure as discussed below are implemented using a software algorithm, program, or code that can reside on a computer useable medium for enabling execution on a machine having a computer processor. The machine can include memory storage configured to provide output from execution of the computer algorithm or program.

As used herein, the term "software" is meant to be synonymous with any logic, code, or program that can be executed by a processor of a host computer, regardless of whether the implementation is in hardware, firmware or as a software computer product available on a disc, a memory storage device, or for download from a remote machine. The embodiments described herein include such software to implement the equations, relationships, and algorithms described above. One skilled in the art will appreciate further features and advantages of the disclosure based on the above-described embodiments. Accordingly, the disclosure is not to be limited by what has been particularly shown and described, except as indicated by the appended claims.

Description of certain illustrated embodiments of the present disclosure will now be provided. With reference now to FIG. 1, the network protection system 100 is provided that monitors network traffic to and from a protected network 118 and applies mitigation countermeasures to detect threat traffic of the network traffic that is associated with an attack in order to protect the protected network 118 or computer devices 116 using the protected network 118 from an attack.

The network protection system 100 includes a blacklist (BL) manager 102 included with or coupled to a threat management system (TMS) 104. The blacklist manager 102 manages at least two different blacklists that are used by respective different mitigation processes applied to network traffic. The mitigation processes are performed at different tiers of the network protection system, a first tier of the network protection system being positioned along a communication path of the network traffic upstream the other mitigation processes, each mitigation process being positioned at a different stream position along the communication path.

The blacklist manager 102 can be integrated with the TMS 104, e.g., housed within a single chassis of the TMS 104 and sharing at least one hardware or software component, or coupled to the TMS 104 via wired or wireless communication. Additionally, the TMS 104 and blacklist manager 102 can be implemented as physical or virtual devices. Whether implemented as a physical or virtual device, the blacklist manager 102 uses a hardware processing device that executes software instructions, which enables performance of the disclosed functions.

The TMS 104 includes one or more central processing units (CPUs) 105 and memory (e.g., random access memory (RAM), and a storage medium), which can be connected through buses and used to further support the processing of the received packets. Programmable instructions can be stored in the storage medium and executed by the CPU to cause the CPU to perform operations described herein. The blacklist manager 102 can share the CPU(s) 105 and memory 106 of the TMS 104, or be configured with its own CPU 105 and memory 106.

In embodiments, at least portions of the network protection system 100 are located between the external network 120 and the protected network 118. In other embodiments, at least portions of the network protection system 100 are located within the external network 120 or protected network 118. At least portions of the network protection system 100 can be located at a network edge (inside or outside of the protected network 118) or deeper within the protected network 118.

A network monitor (not shown) that includes, for example, taps, probes, and/or port mirrors, can be positioned inline, and/or remote relative to communication links of the protected network 118 to detect a network attack and alert the TMS 104.

Computer devices 116 can be devices such as servers, laptop devices, network elements such as routers, switches, and firewalls, embedded computer devices that are embedded in other devices, such as appliances, tools, vehicles, or consumer electronics, mobile devices, such as laptops, smartphones, cell phones, and tablets.

The protected network 118 and external network 120 support intra-network communication via communication links 122 between computer devices 116 included in the respective network that have access to and authority to use the corresponding network. Communication links 122 can be wired or wireless links. The networks 118 and 120 can include one or more networks, such as an intranet, a local area network (LAN), and/or a wide area network (WAN). In examples, the protected network 118 can be an enterprise network, such as a school network, business network, and government network, to list a few examples, that can connect to the Internet. The external network 120 can further include the Internet, which it may use to access the protected network 118.

Network traffic between the protected network 118 and the external network 120 is transmitted via communication links 124, which can include a plurality of wired or wireless communication links. The blacklist manager 102 communicates with the first, second, and third mitigation processes 119, 117, 115. Communication between the blacklist manager 102 and the third mitigation process(es) 115 can be via messages between processes executed by the CPU(s) 105. Communication between the blacklist manager 102 and the second and third mitigation processes 115, 117 can use internal communication paths of the TMS 104, such as buses. Communication between the blacklist manager 102 and the first mitigation process 119 can be via communication link 126, which can be an out-of-band link between the TMS 104 and the external hardware (HW) mitigation device 112. In embodiments the communication link 126 can be included with communication links 124.

In an example, network traffic associated with an attack can emanate from a computer device 116 using the external network 120 and be directed at a computer device 116 using the protected network 118. Depending on the type of attack, the network attack can be instigated and carried on by one or more attacking computer devices 116. These attacking computer devices 116 can work independently from one another or be coordinated, such as in a botnet. For example, some of the attacking computer devices 116 can be zombies.

The attacks can target specific or random attacked computer devices 116. An attacked computer device 116 using the protected network 118 can be converted into an attacking computer device 116. Such an attacking computer can continue to operate legitimately and transmit both threat traffic and legitimate traffic. Accordingly, the network protection system 100 can monitor traffic directed to (inbound) or from (outbound) the protected network 118 and mitigate network attacks that may be applied in either direction.

The attack can involve a variety of unwanted network behavior, such as eavesdropping, data modification, identity spoofing, password-based or compromised-key attacks, denial-of-service attacks, man-in-the-middle attacks, sniffer attacks, and application-layer attacks. The attack can be distributed, such as in a Distributed Denial of Service ("DDoS") attack.

The blacklist manager 102 manages two or three blacklists, including a first blacklist 113, a second blacklist 111, and a third blacklist 109. First blacklist 113 is stored in an external storage device 114 and used by external hardware (HW) mitigation device 112 that executes first mitigation process 119. The first blacklist 113, external storage device 114, external HW mitigation device 112, and first mitigation process 119 form a first blacklist system 128. External HW mitigation device 112 is a processing device that can include hardware and/or firmware. In embodiments, the external storage device 114 and the external HW mitigation device 112 can be integrated in a single device, such as a router, switch, or dedicated blacklisting appliance. [In embodiments, the external storage device 114 can be external to and accessible by the external HW mitigation device 112.

The second blacklist is stored in a local storage device 114 (local to the TMS 104, meaning it is integrated with or coupled to the TMS 104) and used by local HW mitigation device 108 that executes a second mitigation process 117. Local HW mitigation device 108 is a processing device that can include hardware and/or firmware, such as a switch or router. In embodiments, the local storage device 110 and the local HW mitigation device 108 can be integrated in a single device, such as a switch, router, network interface card (NIC), or dedicated blacklisting device. In embodiments, the local HW mitigation device 108 is integrated with the chassis of the TMS 104, wherein the integration means being built into the chassis, being mounted to the chassis, being physically coupled to the chassis or being housed within the chassis. In embodiments, the local storage device 114 can be external to and accessible by the local HW mitigation device 110.

The third blacklist 109 is stored in memory 106 and used by the CPU 105(s) that executes third mitigation process(es) 115. The third mitigation process(es) 115 are executed by the one or more CPUs 105 of the TMS 104 and access the third blacklist 109 stored in the memory 106.

The first, second, and third blacklist systems 128, 130, and 132 are positioned along a communication path of the network traffic, with the first blacklist system 128 upstream from the second and third blacklist systems 130, 132, and the second blacklist system 130 upstream from the third blacklist system 132. In this way, the first mitigation process 119 is performed upstream relative to the second and third mitigation processes 117, 115, and the second mitigation process 117 is performed upstream relative to the third mitigation processes 115.

The remote, upstream positioning of the first blacklist system 128 relative to the second and third blacklist systems 130, 132 provides mitigation using the first blacklist 113 that is offloaded from the TMS 104, meaning the mitigation does not consume bandwidth, physical, or processing resources of the TMS 104. In particular, the first blacklist system 128 does not use CPU(s) 105 of the TMS 104.

The mitigation process(es) (e.g., 119, 117, 115) associated with each blacklist system (e.g., 128, 130, 132) include comparing a characteristic of the source of the network traffic to entries in the corresponding blacklist (e.g., 113, 111, 109). The blacklist system blocks mitigated threat traffic that is associated with an attack (e.g., threat traffic) and forwards the network traffic that is not mitigated (e.g., legitimate traffic). Blocked network traffic is not output from the blacklist system as network traffic for transmission to its intended destination as indicated by the network traffic. Blocked network traffic can be dropped, meaning it is not transmitted anywhere after the comparison to the blacklist is performed. In embodiments, blocked network traffic can be transmitted to a location other than the intended location as indicated by the network traffic, such as to a storage device for further analysis. Forwarded network traffic is output from the blacklist system as network traffic for transmission to its intended destination as indicated by the network traffic.

The first blacklist system 128, when mitigating threat traffic using the first blacklist 113, blocks such threat traffic that would otherwise flow to the TMS 104, thus reducing bandwidth entering the TMS 104, and thus reducing a processing load of the CPU(s) 105.

Accordingly, the TMS 104, including the blacklist manager 102, may not have access to the rate of network traffic entering and exiting the first blacklist system 128, or statistics related to threat traffic mitigated using the first blacklist 113. Accordingly, the TMS 104 may be unable to monitor a rate at which traffic from entries on the first blacklist 113 is blocked. The first blacklist system 128 may also be unable to analyze which traffic is being blocked by entries on the first blacklist 113.

Thus, the TMS 104 and the first blacklist system 128, without access to statistics about the first blacklist 113, may be unable to determine, or it may be difficult to determine, whether a source of network traffic included as an entry on the first blacklist 113 is still sending network traffic. If the entry is no longer sending network traffic, the entry is unnecessarily occupying a valuable entry slot in the first blacklist 113. However, the TMS 104 and the blacklist system 128 may be unaware of how effective entries in the first blacklist 113 are, and thus may leave an ineffective blacklist entry in the first blacklist 113 without removing it.

The first blacklist system 128 may have a slow adjustment rate for removing or inserting entries into the first blacklist 113. Removal or insertion of entries to the first blacklist 113 may be limited to designated periods of time. This may be the case, for example, when the first blacklist system 128 is a router. As updating the first blacklist 113 is an expensive process (e.g., a process that consumes a large amount of time and or processing or physical resources), frequent adding and removing (churning) of entries to the first blacklist 113 is avoided.

Since the second blacklist system 130 is included internally in the chassis of the TMS 104, it does not reduce the bandwidth of network traffic entering the TMS 104, however it does reduce internal bandwidth of the TMS 104, reducing the consumption of the CPUs' 105 resources. The TMS 104 may be able to access statistics related to the second blacklist 111 (e.g., by sending network protocol messages and receiving responses or by receiving unsolicited statistic reports), such as how much network traffic is blocked using the second blacklist 111. Entries can be quickly added or removed from the second blacklist 111, however, the size of the second blacklist 111 is limited to storing a predetermined number of entries.

The third blacklist system 132 uses the CPUs' 105 resources, thus adding to the burden of the CPU(s) 105 without reducing internal bandwidth. Depending on the configuration of network protection system 100, the TMS 104 may not receive information from the first blacklist system 128 with statistics about the first blacklist 113. The TMS 104 itself can determine statistics related to the third blacklist 109, such as how much network traffic is blocked using the third blacklist 109. Entries can be quickly added or removed from the third blacklist 109, and storage of the blacklist 109 uses memory 106 resources of the TMS 104. Since the third blacklist 109 is internal to the TMS 104, it can collect precise statistics about which blacklist entries are most effective along different axes: that is, which blacklist entries cause the most packets per second to be dropped, which blacklist entries cause the most bits per second to be dropped, how long have the entries been in place, etc.

Accordingly, each of the first, second, and third blacklist systems 128, 130, 132 have advantages and disadvantages related to their usage. The blacklist manager 102 thus manages usage of the first, second, and third blacklist systems 128, 130, 132 to avoid the negative effects of the disadvantages, and to take use the advantages.

The blacklist manager 102 can track the length of time and/or number of times that each entry has been included in the first, second, or third blacklists 113, 111, 109. The blacklist manager 102 can track the amount of traffic transmitted by a source associated with each entry of the second or third blacklists 111, 109. The blacklist manager 102 can use both of these factors to decide which entries should be offloaded to the first blacklist 113 by selecting entries that are both long-term violators (e.g., send threat traffic) and high bandwidth transmitters of threat traffic to avoid churning in the first blacklist system 128 to reduce the bandwidth of network traffic entering the TMS 104 and reduce consumption of TMS 104 resources, particularly the CPUs' 105 resources.

Figure 2:
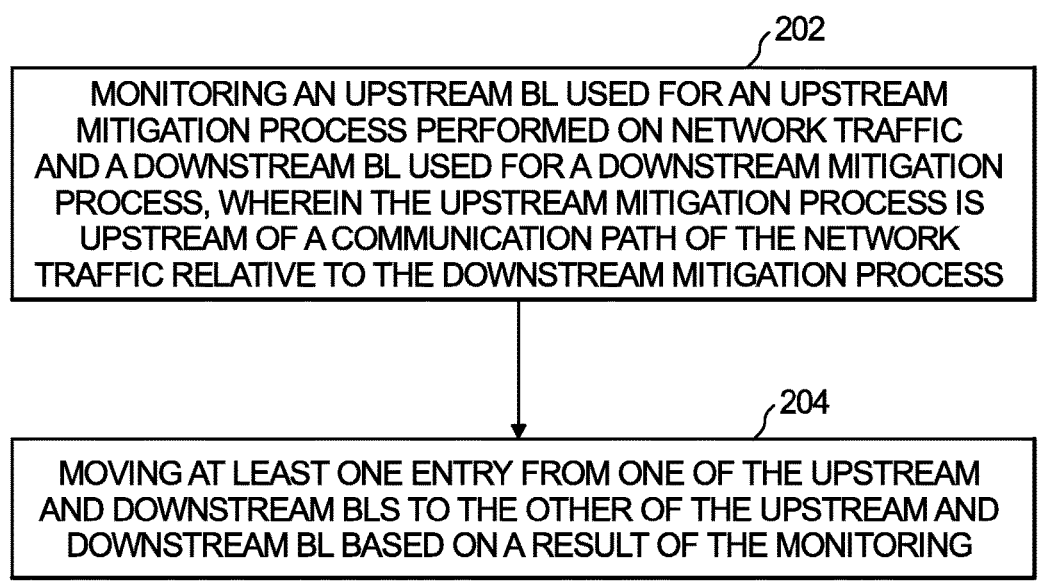
FIG. 2 is an example flowchart showing a high-level method performed by a blacklist manager shown in FIG. 1.
Figure 3:
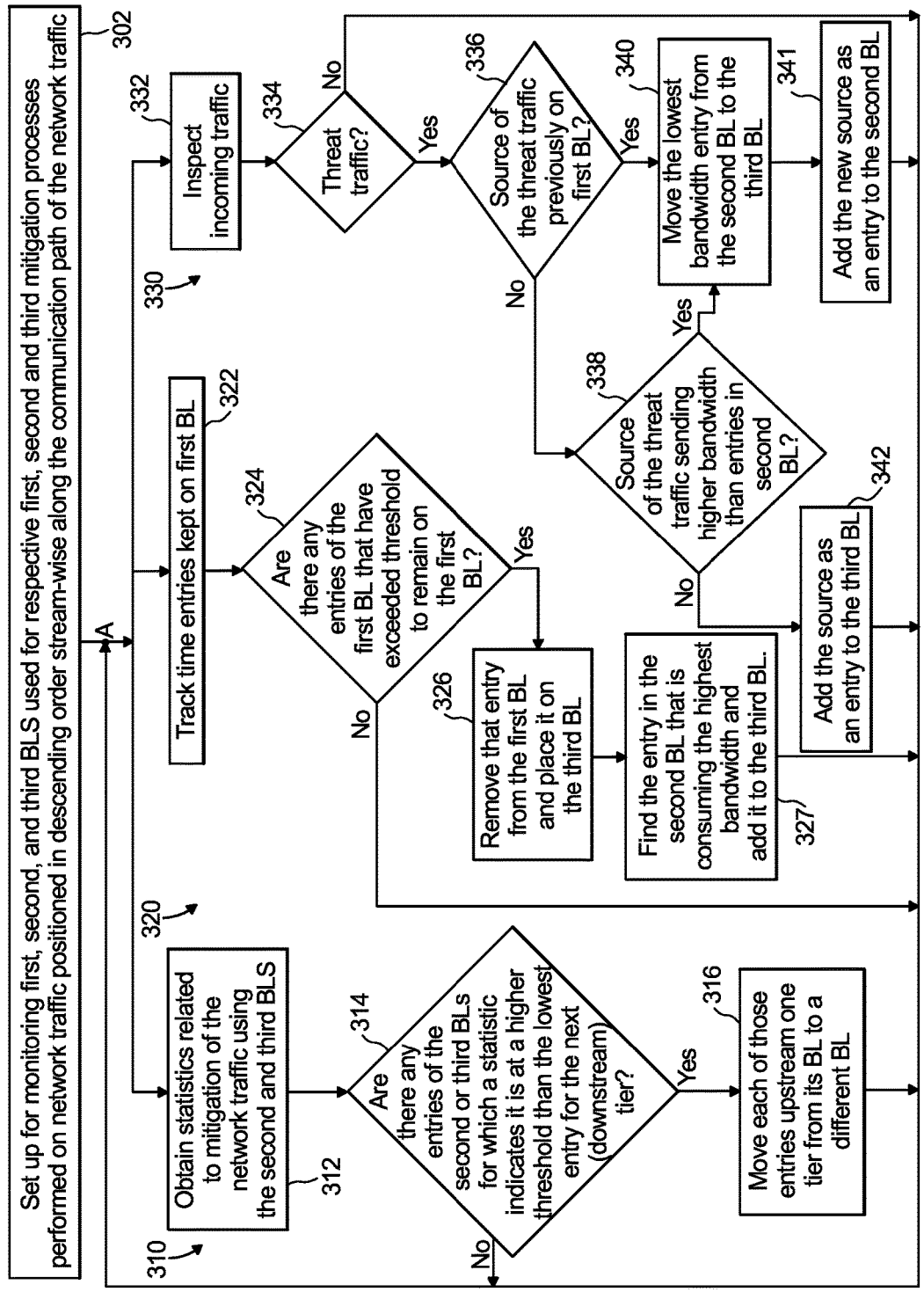
FIG. 3 is an example flowchart showing a detailed method performed by a blacklist manager shown in FIG. 1.

With reference now to FIGS. 2 and 3, shown are flowcharts demonstrating implementation of the various exemplary embodiments. It is noted that the order of operations shown in FIGS. 2 and 3 is not required, so in principle, the various operations may be performed out of the illustrated order. Also certain operations may be skipped, different operations may be added or substituted, or selected operations or groups of operations may be performed in a separate application following the embodiments described herein.

Language that refers to the exchange of information is not meant to be limiting. For example, the term "receive" as used herein refers to obtaining, getting, accessing, retrieving, reading, or getting a transmission. Use of any of these terms is not meant to exclude the other terms. Data that is exchanged between modules can be exchanged by a transmission between the modules, or can include one module storing the data in a location that can be accessed by the other module.

FIG. 2 shows a flowchart of example operations performed to manage different blacklist systems, such as by blacklist manager 102 shown in FIG. 1. At operation 202, at least an upstream and a downstream blacklist are monitored.

The upstream blacklist is used for an upstream mitigation process performed on network traffic, and the downstream blacklist is used for a downstream mitigation process performed on the network traffic. The downstream mitigation process is performed downstream along a communication path of the network traffic from the upstream mitigation process.

The upstream mitigation process and downstream mitigation process can be, for example, either the first mitigation process 119 performed by an external hardware mitigation device (such as external hardware mitigation device 112 shown in FIG. 1) using a first blacklist (such as first blacklist 113 shown in FIG. 1) stored by an offload storage device (such as offload storage device 114 shown in FIG. 1), or the second mitigation process 117 performed by a local hardware mitigation device (such as local hardware mitigation device 108 shown in FIG. 1) using a second blacklist (such as second blacklist 111 shown in FIG. 1) stored by a local storage device (such as local storage device 110 shown in FIG. 1). The downstream mitigation process is a different process than the upstream mitigation process, and can be either the second mitigation process 117 or the third mitigation process(es) 115 performed by a CPU of the TMS (such as CPU(s) 105 shown in FIG. 1) using a third blacklist (such as third blacklist 109 shown in FIG. 1) stored by a memory of the TMS (such as memory 106 shown in FIG. 1).

At operation 204, at least one entry from one of the upstream and downstream blacklists is moved to the other of the upstream and downstream blacklists based on a result of the monitoring.

With returned reference to FIG. 1, in embodiments, the blacklist manager 102 periodically removes entries included in the first blacklist 113, because attacking sources often stop sending threat traffic at some point, and it can be inefficient to store entries indefinitely. The entry remains on the third blacklist 109, so the blacklist manager 102 can continue to track a source after removing the associated entry from the first blacklist 113 to determine if it is still sending threat traffic. If the blacklist manager 102 determines that a recently removed entry is still sending threat traffic, it can be inferred that threat traffic was being sent by the associated source while it was included in the first blacklist, even though statistics were not collected. If the source is still sending threat traffic it can be monitored for a time, and based on the monitoring, it can be added to either the first blacklist 113 or the second blacklist 111.

In embodiments, the blacklist manager 102 also monitors newly arrived network traffic. When the blacklist manager 102 determines that a high-bandwidth source is sending more traffic than entries included in the third blacklist 109, the blacklist manager 102 adds an entry associated with that source to the second blacklist 111, decreasing internal bandwidth of the TMS 104 and relieving the CPU(s) 105 from analyzing the threat traffic generated by that source. While the entry associated with the source is included on the second blacklist 111, statistics related to mitigation of threat traffic sent by a source associated with the entry can be obtained. The blacklist manager 102 can use these statistics to determine whether to keep the entry on the second blacklist 111 or to move it upstream to the first blacklist 113. The determination to add the entry to the first blacklist 113 is made when the tracking statistics related to mitigation of threat traffic sent by a source associated with the entry indicate that the entry is likely to remain on the first blacklist 113 for some time. Thus, churning the first blacklist system 128 that has expensive updating process can be avoided.

FIG. 3 shows a flowchart of example operations performed to manage different blacklist systems, such as by manager 102 shown in FIG. 1, including greater detail than the process shown in FIG. 2.

At operation 302, the blacklist monitor is set up to monitor first, second, and third blacklists that are used for respective first, second and third mitigation processes performed on network traffic, and that are positioned in descending order stream-wise along a communication path of the network traffic. In other words, the first mitigation process is performed upstream relative to the second mitigation process, which is performed upstream relative to the third mitigation process. In embodiments, the blacklist monitor can monitor a combination of any of the first, second, and third blacklists, including any two of the first, second, and third blacklists, or all three of the blacklists.

The first mitigation process is performed by an external hardware mitigation device (such as external hardware mitigation device 112 shown in FIG. 1) using a first blacklist (such as first blacklist 113 shown in FIG. 1) stored by an offload storage device (such as offload storage device 114 shown in FIG. 1). The second mitigation process is performed by a local hardware mitigation device (such as local hardware mitigation device 108 shown in FIG. 1) using a second blacklist (such as second blacklist 111 shown in FIG. 1) stored by a local storage device (such as local storage device 110 shown in FIG. 1). The third mitigation process is performed by a CPU of the TMS (such as CPU(s) 105 shown in FIG. 1) using a third blacklist (such as third blacklist 109 shown in FIG. 1) stored by a memory of the TMS (such as memory 106 shown in FIG. 1).

The monitoring continues along three branches 310, 320, and 330, which can be performed at least partially in parallel to one another or at least partially in series relative to one another, or a combination thereof. At branch 310, the first and second blacklists 113 and 111 are monitored to determine whether to move an entry between the first and second blacklists. At branch 320, the first blacklist is monitored to manage entries that have been on the first blacklist for more than a threshold amount of time. At branch 330, incoming network traffic is monitored to determine if an entry associated with a particular source should be added to a blacklist, including determining which blacklist to add the new entry to.

With reference to branch 310, at operation 312, statistics are obtained, wherein the statistics are related to mitigation of threat traffic using the second and third blacklist. In embodiments, statistics related to mitigation of the threat traffic using the first blacklist are not available and are not obtained. The statistics associated with the second and/or third blacklists can include, for example, a length of time that entries have been included in the blacklist, a number of times that entries have been included in the blacklist, and/or an amount of network traffic sent by a source associated with the entries.

At operation 314, a determination is made whether there are any entries of the second and third blacklists for which an associated statistic indicates it is at a higher threshold than the lowest entry for the next (downstream) tier. For example, respective thresholds can be associated with a length of time that entries are permitted to be included in each of the respective blacklists, a number of times that entries are permitted to be included in each of the respective blacklists, and/or an amount of network traffic that is permitted to be sent by a source associated with the entries of the respective blacklists.

At operation 316, if the determination at operation 314 is YES, indicating that at least one entry for which an associated statistic obtained is determined to have exceeded a threshold of the lowest entry for the next downstream tier, each of those entries determined at operation 314 is moved upstream one tier from its blacklist to a different blacklist.

For example, if the length of time an entry was included in one of the second or third blacklists exceeds a length of time threshold for that blacklist, or a number of times the entry was included in one of the second or third blacklists exceeds a number of times threshold for that blacklist, or an amount of network traffic sent by a source associated with the entry exceeds an amount of traffic threshold for that blacklist, that entry is moved upstream one tier. For example, if the entry is included in the third blacklist, it is moved upstream one tier to the second blacklist; and if the entry is included in the second blacklist, it is moved upstream one tear to the first blacklist. The process continues at Node A, at which the three branches 310, 320, 330 are performed. If the determination at operation 314 is NO, indicating that none of the entries for which a statistic obtained is determined to have exceeded a threshold, the process continues at Node A.

With reference to branch 320, at operation 322, an amount of time each of the entries in the first blacklist remains on the first blacklist is tracked. At operation 324, a determination is made whether any of the entries in the first blacklist has exceeded a time threshold for remaining on the first blacklist. If the determination at operation 322 is YES, indicating that one or more of the entries has exceeded the time threshold for remaining on the first blacklist, then at operation 326 those one or more entries are removed from the first blacklist and placed on the third blacklist. Next, at operation 327, an entry in the second blacklist is determined that consumes the highest bandwidth and the determined entry is added to the third blacklist. Thus, churning of the third blacklist is avoided, while the third blacklist blocks sources that have been determined to be senders of the highest bandwidths. The process then continues at Node A, at which the three branches 310, 320, 330 are performed. In this way, when the source is still transmitting a high volume of traffic, the CPU of the TMS and/or the protected network will not be detrimentally affected. The entries that were moved to the third blacklist provide protection without risking harm to the protected network.

The removed entries are entered onto the blacklist at the next downstream tier. If the source associated with those entries continues to send threat traffic, in branch 310 the statistics from those entries may cause the entry to be moved to the next upstream tier. In embodiment, when the entry is entered on a blacklist, the blacklist used is selected to be a blacklist for which statistics can be obtained. If the determination at operation 322 is NO, indicating that none of the entries has exceeded the time threshold for remaining on the first blacklist, then the process continues at Node A without removing any entries from the first blacklist.

With reference to branch 330, at operation 332 incoming traffic is inspected and mitigated by CPU(s) 105. At operation 334, a determination is made whether threat traffic (as opposed to legitimate traffic) is detected based on rules applied by the CPU 105. If the determination at operation 334 was YES, meaning that threat traffic was detected, then at operation 336, a determination is made whether the source transmitting the threat traffic detected at operation 334 is associated with an entry that was previously stored on the first blacklist. In embodiments, the determination made at operation 336 considers whether the entry was previously stored on the first blacklist within a predetermined window of time, such as within the past five to sixty minutes. The process continues at operation 338. If the determination at operation 334 was NO, meaning that threat traffic was not detected, then the process continues at Node A, at which the three branches 310, 320, 330 are performed.

At operation 338, a determination is made whether a source transmitting the threat traffic detected at operation 334 is transmitting a higher bandwidth of threat traffic than sources associated with entries included in the third blacklist. If the determination at operation 338 was YES, meaning the source transmitted a higher bandwidth of threat traffic compared to sources associated with each of the entries included in the second blacklist, then at operation 340, the entry included in the second blacklist associated with a source sending the lowest bandwidth of threat traffic is moved to the third blacklist. Next, at operation 341, an entry associated with the source is added to the second blacklist, after which the process continues at Node A. Thus, since the second blacklist is likely to be full, the entry associated with the source is swapped for the entry associated with the source sending the lowest bandwidth of threat traffic, which is moved to the third blacklist. The comparison at operation 338 assures that the entry associated with the source is pushed onto the second blacklist only if it is associated with a source sending a higher bandwidth of threat traffic than the entry in the second blacklist associated with a source sending the lowest bandwidth of threat traffic, If the determination at operation 338 was NO, meaning the source transmitted a lower bandwidth of threat traffic compared to sources associated with entries included in the third blacklist, then at operation 342, an entry associated with the source is added to the third blacklist, after which the process continues at Node A.

Once the entry is added to the second or third blacklists at operations 340 or 342, as branch 310 is executed, the entry may be moved further upstream based on the statistics associated with the entry. While on the second or third blacklists, statistics can continue to be obtained to determine how much threat traffic is transmitted by the associated source, how long the entry has been on the corresponding blacklist, and/or how many times the entry has been cycled off and back onto the corresponding blacklist.

Since insertion or removal of entries to or from the first blacklist is expensive, an entry is added to the first blacklist based on an indication by the statistics that the associated source is a long term and/or high bandwidth violator. Thus addition of an entry to the first blacklist is based on a prediction that the associated source will continue to send a threshold volume of threat traffic for a threshold amount of time. Using the statistics to move entries upstream avoids unnecessary churning of the first and second blacklists, while allowing entries to be moved as far upstream as possible to reduce bandwidth into or within the TMS. Since statistics for the first blacklist are not obtained, periodically, the entries on the first blacklist are removed and allowed to be reanalyzed for the purpose of obtaining fresh statistics that will aid in moving the entry to the appropriate blacklist.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the blacklist manager 102 and the TMS 104, separately or combined, may be implemented or executed by one or more computer systems. For example, the blacklist manager 102 and the TMS 104 can be implemented using a computer system such as example computer system 402 illustrated in FIG. 4. In various embodiments, computer system 402 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 402 is only one example of a suitable system and is not intended to suggest any limitation as to the scope of use or functionality of embodiments of the disclosure described herein. Regardless, computer system 402 is capable of being implemented and/or performing any of the functionality set forth hereinabove.

Computer system 402 may be described in the general context of computer system-executable instructions, such as program modules, being executed by a computer system. Generally, program modules may include routines, programs, objects, components, logic, data structures, and so on that perform particular tasks or implement particular abstract data types. Computer system 402 may be practiced in distributed data processing environments where tasks are performed by remote processing devices that are linked through a communications network. In a distributed data processing environment, program modules may be located in both local and remote computer system storage media including memory storage devices.

Figure 4:
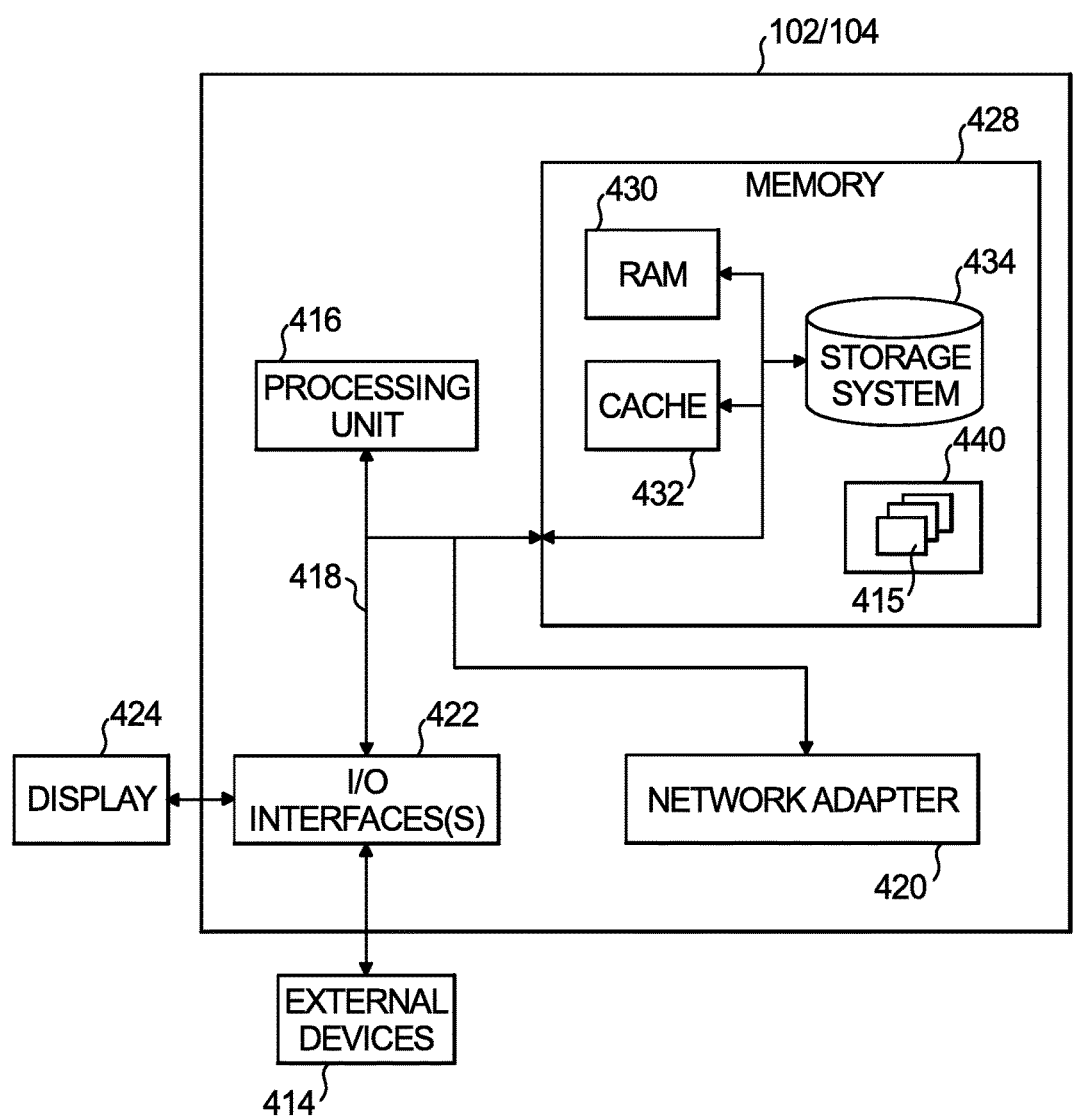
FIG. 4 illustrates an example computing system that could be used to implement the blacklist manager in accordance with an aspect of the disclosure.

Computer system 402 is shown in FIG. 4 in the form of a general-purpose computer device. The components of computer system 402 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 402 typically includes a variety of computer system readable media. Such media may be any available media that is accessible by computer system 402, and it includes both volatile and non-volatile media, removable and non-removable media.

System memory 428 can include computer system readable media in the form of volatile memory, such as random access memory (RAM) 430 and/or cache memory 432. Computer system 402 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the disclosure.

Program/utility 440, having a set (at least one) of program modules 415, such as computer system 402, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 415 generally carry out the functions and/or methodologies of embodiments of the disclosure as described herein.

Computer system 402 may also communicate with one or more external devices 414 such as a keyboard, a pointing device, a display 424, etc.; one or more devices that enable a user to interact with computer system 402; and/or any devices (e.g., network card, modem, etc.) that enable the blacklist manager 102 and the TMS 104 to communicate with one or more other computer devices. Such communication can occur via Input/Output (I/O) interfaces 422. Still yet, computer system 402 can communicate with one or more networks such as a local area network (LAN), a general wide area network (WAN), and/or a public network (e.g., the Internet) via network adapter 420. As depicted, network adapter 420 communicates with the other components of the blacklist manager 102 and the TMS 104 via bus 418. It should be understood that although not shown, other hardware and/or software components could be used in conjunction with computer system 402. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

The invention claimed is:

1. A computer-implemented method to manage blacklists used for mitigating threat traffic associated with a network attack, the method comprising:
   manage, using a central blacklist manager, first, second and third mitigation systems, wherein the first mitigation system includes a first blacklist, the second mitigation system includes a second blacklist and the third mitigation system includes a third blacklist and wherein the first blacklist is upstream the second and third blacklists with the second blacklist being upstream to the third blacklist relative to one or more protected devices, and wherein the central blacklist manager has a processor such that upon execution of instructions is configured to:
   monitor the first blacklist used by a first mitigation process of the first mitigation system and determine an amount of time a blacklist entry has been on the first blacklist;
   monitor the second blacklist used by a second mitigation process of the second mitigation system and determine an amount of time a blacklist entry has been on the second blacklist;

monitor the third blacklist used by a third mitigation process of the third mitigation system and determine an amount of time a blacklist entry has been on the third blacklist, whereby a blacklist entry is moved from the third blacklist to the second blacklist if it is determined the blacklist entry was on the third blacklist beyond a threshold time, and move a blacklist entry from the second blacklist to the first blacklist if it is determined the blacklist entry was on the second blacklist beyond the threshold time;

determine an amount of time entries are included with the first blacklist;

determine if any of the time entries have been included with the first blacklist for more than a threshold amount of time; and remove from the first blacklist each blacklist entry determined to have been included with the first blacklist for more than the threshold amount of time.

2. The method of claim 1, wherein monitoring the first and second blacklists includes obtaining statistics related to mitigation of threat traffic associated with a network attack using the second blacklist, and does not include obtaining statistics related to mitigation of threat traffic associated with a network attack using the first blacklist.

3. The method of claim 2, wherein the statistics include at least one of an indication of an amount of traffic sent by sources associated with entries included in the second blacklist or a length of time the respective entries have been included on the second blacklist.

4. The method of claim 1, wherein the first and second mitigation processes are performed by the respective first and second mitigation devices, and the first and second mitigation devices have two different types, the types being selected from a threat management system (TMS) performing software threat management with software mitigation using software blacklisting; a switch device integrated with a chassis of the TMS, the switch device performing hardware mitigation using hardware blacklisting; and an offloaded hardware device physically remote from the chassis, the offloaded hardware device performing hardware mitigation using hardware blacklisting.

5. The method of claim 1, wherein the first blacklist has limited space for including entries available relative to the second blacklist.

6. The method of claim 5 further comprising:

monitoring incoming network traffic;

comparing a characteristic of sources sending network traffic determined to include threat traffic to entries that were previously stored on the first blacklist;

identifying, based on the comparison, sources that are associated with entries previously stored on the first blacklist; and adding entries previously stored on the first blacklist that are associated with the identified sources.

7. The method of claim 6, further comprising:

determining whether a source of the network traffic determined to be transmitting threat traffic is transmitting a larger amount of threat traffic than has been transmitted by sources associated with entries in the second blacklist;

adding an entry associated with the source to the third blacklist if it is determined that the source is transmitting the larger amount of threat traffic; and adding an entry associated with the source to the second blacklist if it is determined that the source is not transmitting the larger amount of threat traffic.

8. The method of claim 1, wherein the first mitigation process is performed upstream relative to the central blacklist manager.

9. The method of claim 1, wherein moving entries to and from the second blacklist is more time consuming than moving entries to the first blacklist.

10. The method of claim 1, wherein each of the first, second and third mitigation systems includes a computer processor independent of one another for monitoring the respective blacklist of each of the first, second and third mitigation systems.

* * * * *